く12) United States Patent
Suzuki et al.

(10) Patent No.: US 8,543,666 B2
(45) Date of Patent: Sep. 24, 2013

(54) SYSTEM, ARRANGEMENT AND METHOD FOR PROVIDING NUMERICAL ANALYSIS DATA, AND NUMERICAL ANALYSIS DATA UTILIZATION DEVICE

(75) Inventors: Noriyuki Suzuki, Chiba (JP); Akihiro Uenishi, Chiba (JP); Yukihisa Kuriyama, Chiba (JP); Toshiyuki Niwa, Chiba (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 987 days.

(21) Appl. No.: 10/584,170

(22) PCT Filed: Dec. 10, 2004

(86) PCT No.: PCT/JP2004/018463
§ 371 (c)(1), (2), (4) Date: Aug. 24, 2007

(87) PCT Pub. No.: WO2005/062213
PCT Pub. Date: Jul. 7, 2005

(65) Prior Publication Data
US 2007/0282931 A1 Dec. 6, 2007

(30) Foreign Application Priority Data

Dec. 22, 2003 (JP) .................................. 2003-425535
Sep. 10, 2004 (JP) .................................. 2004-264433

(51) Int. Cl.
*G06F 15/16* (2006.01)
*G06F 17/50* (2006.01)
*G06G 7/50* (2006.01)
*G06G 7/48* (2006.01)

(52) U.S. Cl.
USPC ..................... 709/219; 703/7; 703/9; 703/13

(58) Field of Classification Search
USPC ......................................................... 709/219
See application file for complete search history.

(56) References Cited

U.S. PATENT DOCUMENTS 6,018,733 A * 1/2000 Kirsch et al. ...................... 707/3
6,055,541 A * 4/2000 Solecki et al. ....................... 1/1
(Continued)

FOREIGN PATENT DOCUMENTS

JP 2001-222571 8/2001
JP 2001318888 11/2001
(Continued)

OTHER PUBLICATIONS

Tolerie, Marlau Ed., "Esi Group Pam-Stamp 2G", vol. 116, Dec. 2002, p. 16.

(Continued)

*Primary Examiner* — Saleh Najjar
*Assistant Examiner* — Michael Chao
(74) *Attorney, Agent, or Firm* — Dorsey & Whitney LLP

(57) ABSTRACT

Exemplary embodiments of the present invention relate to a numerical analysis data providing system. The system can include a server side computer which may provide numerical analysis data to a user side computer connected to a network. The server side computer can record a material name and a property item with corresponding to any one or more types of property values from a mechanical property value, a thermal physical property value, and an electromagnetic property value as for plural materials. Such server side computer can extract one or more types of material property data from the mechanical property value, the thermal physical property value, and the electromagnetic property value corresponding to the material name and the property item recorded by a material property data storage arrangement based on the material name and the property item transmitted from the user side computer. In addition, the server side computer can transmit the extracted data to the user side computer.

16 Claims, 9 Drawing Sheets

(56) References Cited

U.S. PATENT DOCUMENTS

| | | | |
|---|---|---|---|
| 6,246,410 B1 * | 6/2001 | Bergeron et al. | 715/854 |
| 6,330,670 B1 * | 12/2001 | England et al. | 713/2 |
| 6,353,768 B1 | 3/2002 | Karafillis et al. | |
| 6,418,554 B1 * | 7/2002 | Delo et al. | 717/174 |
| 6,623,159 B2 * | 9/2003 | Takahara et al. | 374/55 |
| 6,799,463 B2 * | 10/2004 | Fields et al. | 73/577 |
| 6,813,749 B2 * | 11/2004 | Rassaian | 716/4 |
| 6,868,363 B2 * | 3/2005 | Baran et al. | 702/158 |
| 2002/0032679 A1 | 3/2002 | Hira et al. | |
| 2002/0035450 A1 | 3/2002 | Thackston | |
| 2002/0107948 A1 * | 8/2002 | Ali et al. | 709/223 |
| 2005/0010605 A1 * | 1/2005 | Conrad et al. | 707/104.1 |

FOREIGN PATENT DOCUMENTS

| | | |
|---|---|---|
| JP | 200282962 | 3/2002 |
| JP | 2002-236709 | 8/2002 |
| JP | 2002-251502 | 9/2002 |
| JP | 2003036277 | 2/2003 |
| JP | 2003-345633 | 5/2003 |
| JP | 2003167925 | 6/2003 |
| JP | 2003271724 | 9/2003 |
| JP | 2003303215 | 10/2003 |

OTHER PUBLICATIONS

Tumkor S, "Internet-based design catalogue for the shaft and bearing", Research in Engineering Design Springer-Verlag USA, vol. 12, No. 3, 2000 pp. 163-171.

European Search Report No. 04820691.6-2224 PCT/JP2004018463 dated Nov. 8, 2007.

PCT Preliminary Examination report for International Application No. PCT/JP2004/018463 dated Sep. 25, 2006.

Japanese Search Report for associated Japanese Patent Application No. 2004-264433.

* cited by examiner

F I G. 1
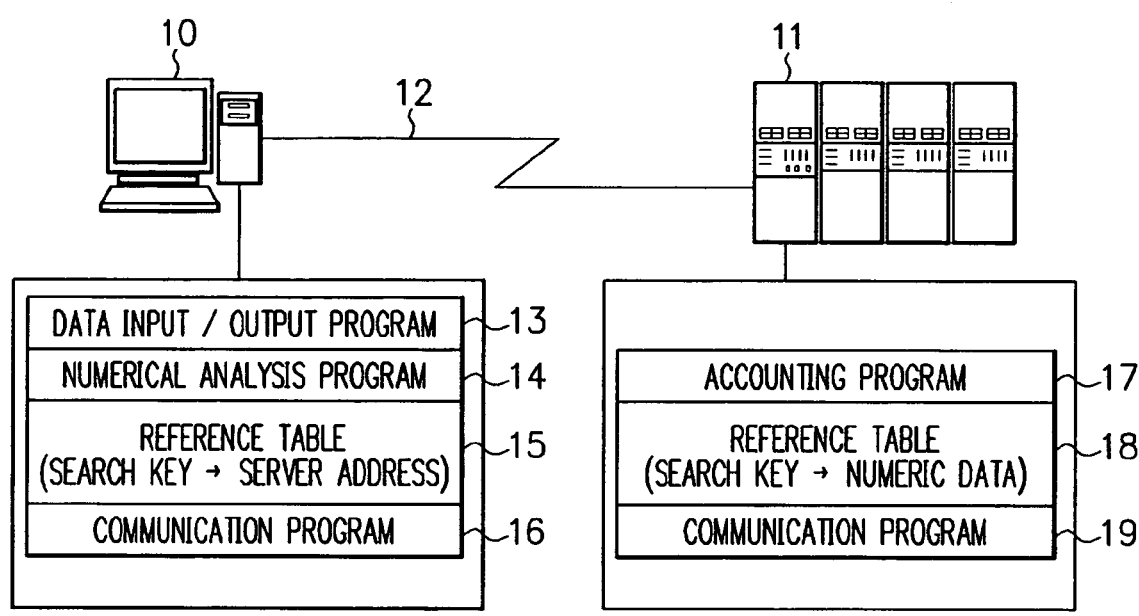

F I G. 2

```
*TITLE                          ; TITLE OF SIMULATION
  :                                                              ] 2
*NODE                           ; NODAL POINT DATA
  :                                                              ] 3
*ELEMENT, TYPE=SHELL, NAME=BLANK ; ELEMENT DATA (NAME='BLANK')
  :                                                              ] 4
*MATERIAL, NAME=BLANK           ; PHYSICAL PROPERTY DATA (NAME='BLANK')
TYPE=MECHANICAL, SOURCE=INPUT, MODEL=003, CONSTANTS=8
2.06e5, 0.3, 150, 350, 0.225, 0.0015, 2.1, 7.8e-9                ] 5

*GEOMETRY, NAME=BLANK           ; GEOMETRICAL SHAPE DATA (NAME='BLANK')
1.2                                                              ] 6
*BOUNDARY                       ; BOUNDARY CONDITION DATA
  :                                                              ] 7
*STEP                           ; CALCULATION CONDITION
  :                                                              ] 8
*END STEP
```

FIG. 3

```
*TITLE                          ; TITLE OF SIMULATION
  :                                                          ]2
*NODE                           ; NODAL POINT DATA
  :                                                          ]3
*ELEMENT, TYPE=SHELL, NAME=BLANK ; ELEMENT DATA (NAME='BLANK')
  :                                                          ]4
*MATERIAL, NAME=BLANK           ; PHYSICAL PROPERTY DATA (NAME='BLANK')
TYPE=MECHANICAL, SOURCE=NET
spcc, MODEL=003                                               ]5
*GEOMETRY, NAME=BLANK           ; GEOMETRICAL SHAPE DATA (NAME='BLANK')
1.2                                                           ]6
*BOUNDARY                       ; BOUNDARY CONDITION DATA
  :                                                          ]7
*STEP                           ; CALCULATION CONDITION
  :                                                          ]8
*END STEP
```

F I G. 4

| MATERIAL NAME (SEARCH KEY 1) | DATA TYPE (SEARCH KEY 2) | MATERIAL MODEL INDENTIFICATION NUMBER (SEARCH KEY 3) | DATA SERVER IDENTIFICATION NUMBER |
|---|---|---|---|
| spcc | MECHANICAL | 001 | www.abc.com |
| spcc | MECHANICAL | 002 | www.abc.com |
| spcc | MECHANICAL | 003 | www.abc.com |
| : | : | : | : |
| spcc | THERMAL | 001 | www.def.com |
| : | : | : | : |
| sus304 | MECHANICAL | 001 | www.def.com |
| : | : | : | : |
| a1050p | MECHANICAL | 001 | www.ghi.com |
| : | : | : | : |
| : | : | : | : |
| : | : | : | : |
|  |  |  |  |
|  |  |  |  |

| MATERIAL NAME (SEARCH KEY 1) | DATA TYPE (SEARCH KEY 2) | MATERIAL MODEL IDENTIFICATION NUMBER (SEARCH KEY 3) | NUMERIC DATA |
|---|---|---|---|
| spcc | MECHANICAL | 001 | *, *, *, *, *, *, ... |
| spcc | MECHANICAL | 002 | *, *, *, *, *, *, ... |
| spcc | MECHANICAL | 003 | 206e5, 0.3, 150, 350, 0.225, 0.0015, 21, 7.8e-9 |
| : | : | : | *, *, *, *, *, *, ... |

F I G. 8
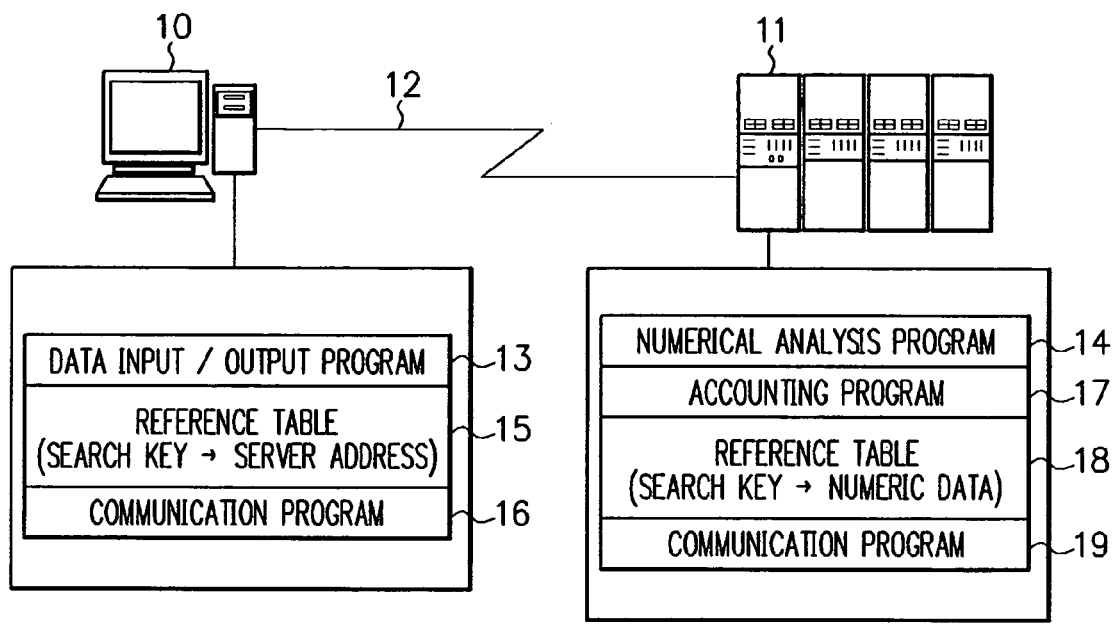

F I G. 10
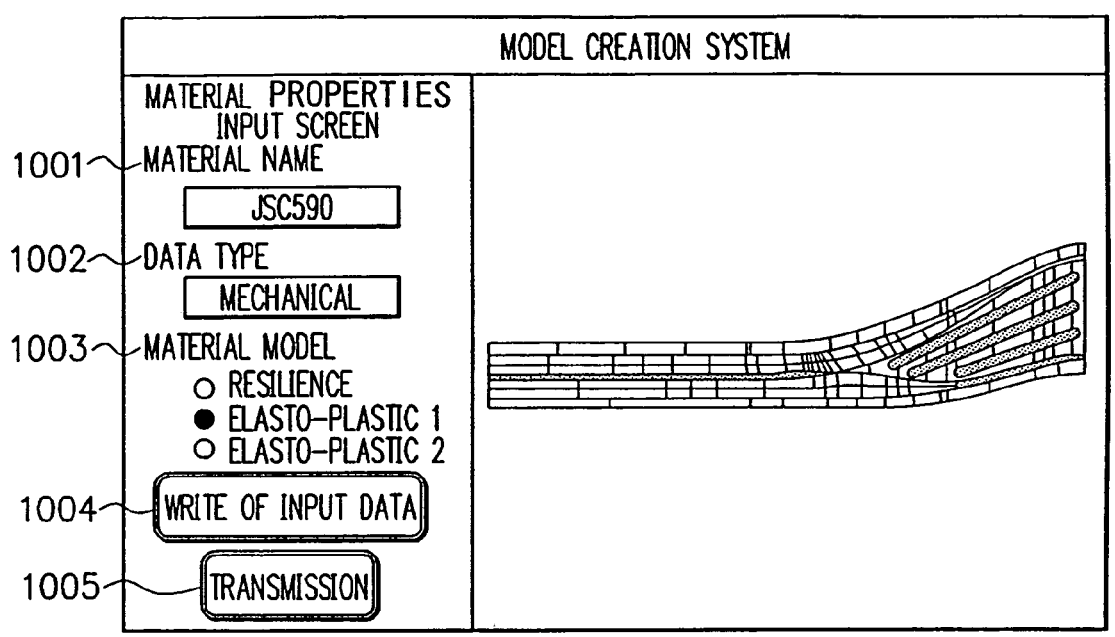

SYSTEM, ARRANGEMENT AND METHOD FOR PROVIDING NUMERICAL ANALYSIS DATA, AND NUMERICAL ANALYSIS DATA UTILIZATION DEVICE

CROSS REFERENCE TO RELATED APPLICATION(S)

This application is a national stage application of PCT Application No. PCT/JP2004/018463 which was filed on Dec. 10, 2004 and published on Jul. 7, 2005 as International Publication No. WO 2005/062213 (the "International Application"), the entire disclosure of which is incorporated herein by reference. This application claims priority from the International Application pursuant to 35 U.S.C. §365. The present application also claims priority under 35 U.S.C. §119 from Japanese Patent Application No. 2003-425535, filed Dec. 22, 2003, and Japanese Patent Application No. 2004-264433 filed Sep. 10, 2004, the entire disclosures of which are incorporated herein by reference.

FIELD OF THE INVENTION

The present invention relates to computer simulations such as a structural analysis, a heat conduction analysis, a fluid analysis, and an electromagnetic filed analysis using a finite element method and a finite difference method, in particular, to a numerical analysis data providing system, arrangement and method, and a numerical analysis data utilization device to provide the numerical analysis data required for a numerical analysis, e.g., for use in an analysis relating to a processing, an assembling, a performance of metallic materials for automobiles, home electronic appliances, an architectural field, and so on.

BACKGROUND INFORMATION

According to a rapid progress of a computer technology, large-scaled numerical simulations such as a structural analysis, a heat conduction analysis, a fluid analysis, and an electromagnetic filed analysis are utilized in many industrial fields, and commercially available software arrangements and systems are growing, respectively.

It is important to correctly input appropriate physical property values, boundary conditions such as loads, and constraints, accurate shapes, etc. to secure reliability and accuracy of the simulations as indicated above. Generally, an analysis engineer executing the simulation works with these inputs individually with reference to data files, case files, etc. In particular, as for the physical property values, it is possible to obtain reliable data independent from analysts by referring to science chronologies, manuals, etc. for simple calculations as a linear analysis such as an elastic structure analysis, a steady heat condition analysis, a potential flow analysis, an electric field analysis. However, as for the problems associated with high nonlinearity such as an elastoplasticity analysis, a nonlinear heat conduction analysis, a turbulent analysis, a nonlinear electromagnetic filed analysis, and coupling analyses thereof, it may be difficult to obtain appropriate physical property value data. Therefore, there are cases in which to use different input data by each analyst. As a result, there may be problems that the reliability and the accuracy of the simulation are spoiled.

Further, in the case of a steel sheet for automobiles, one coil extends to several hundred meters, and plural material properties detailed data stretching the length thereof can provide an enormous quantity of data. Certain difficulties arise with managing these data for user's simulation while maintaining a confidentiality manually or by a simple database administration function at present when the steel sheet for automobiles are used by users for dozens of coils day by day.

A method to distribute a database with attaching to a simulation software can be provided to address the above-described problems. However, there are problems associated therewith, such as it is difficult to perform a maintenance such as an addition, modification, deletion of data as needed, and using compensations such as experimental expenses to obtain data can not be retrieved.

In addition, a method to provide material data via a network is described in Japanese Patent Application Laid-open No. 2003-36277, and a method to provide information required for a structural analysis via a network is described in Japanese Patent Application Laid-open No. 2003-167925. However, in the methods described in Japanese Patent Application Laid-open No. 2003-36277 and Japanese Patent Application Laid-open No. 2003-167925, a conversion and a modification of provided data are possible. Therefore, a source of data and a distinction with other data become ambiguous in accordance with a continuous usage. As a result, this may cause a deterioration of reliability of the simulation, and deterioration of confidentiality.

SUMMARY OF EXEMPLARY EMBODIMENTS OF THE INVENTION

One of the objects of the present invention is to provide numerical analysis data and numerical analysis results with high reliability, while maintaining the confidentiality in the computer simulations of the structural analysis, the heat conduction analysis, the fluid analysis, and the electromagnetic filed analysis using the finite element method and the finite difference method, and further to enable to retrieve a compensation from the users. Another object of the present invention is to provide an accurate and detailed material property value required for a simulation according to a user's request, on-demand, via a network when the user performs a computer simulation. A user side computer can include a numerical analysis arrangement, and a management of the accurate and detailed material property data required for the numerical analysis is performed in a bulk at a server side, and the accurate and detailed material property value is provided to a simulation user in an invisible state so as to secure confidentiality.

A numerical analysis data-providing system according to an exemplary embodiment of the present invention can be provided. In this exemplary system, a server side computer can provide numerical analysis data to a user side computer connected to a network to perform a numerical analysis about a working member and a forming member created by using a desired material. The user side computer can include: an input arrangement configured for inputting a material name and a property item; a storage arrangement configured for storing addresses of the server side computer corresponded to the material name and the property item; and a material name and property item transmitting arrangement configured for transmitting the material name and the property item to the server side computer having the address corresponded to the material name and the property item inputted from the input arrangement. The server side computer can include: (i) a material property data storage arrangement in which the material name and the property item are stored with corresponding to any one or more types of material property data from a mechanical property value, a thermal physical property value, and an electromagnetic property value as for plural materials; (ii) a material name and property item receiving means receiving the material name and the property item transmitted from the material name and property item transmitting arrangement of the user side computer; (iii) an extracting means extracting any one or more kinds of material property data from the mechanical property value, the thermal physical property value, and the electromagnetic property value corresponding to the material name and the property item stored by the material property data storage arrangement based on the received material name and property item; and a (iv) material property data transmitting arrangement transmitting the material property data extracted by the extracting arrangement to the user side computer. The user side computer can further include a material property data receiving arrangement receiving the material property data transmitted from the material property data transmitting arrangement of the server side computer, and a numerical analysis arrangement configured for performing a numerical analysis by using the material property data so that a user does not concern substances of the material property data.

A numerical analysis data providing device according to another exemplary embodiment of the present invention which can be provided for facilitating numerical analysis data to a user side computer connected to a network to perform a numerical analysis about a working member and a forming member created by using a desired material. The device can include: (i) a material property data storage arrangement in which a material name and a property item can be stored with corresponding to any one or more kinds of material property data from a mechanical property value, a thermal physical property value, and an electromagnetic property value as for plural materials; (ii) a material name and property item receiving arrangement configured for receiving the material name and the property item transmitted from the user side computer; (iii) an extracting arrangement configured for extracting any one or more kinds of material property data from the mechanical property value, the thermal physical property value, and the electromagnetic property value corresponding to the material name and the property item stored by the material property data storage arrangement based on the received material name and property item; (iv) a material property data transmitting arrangement configured for transmitting the material property data extracted by the extracting arrangement to the user side computer; and (v) an arrangement configured for making the material property data available to a numerical analysis arrangement possessed by the user side computer but invisible to a user when the material property data extracted by the extracting arrangement is transmitted to the user side computer.

A numerical analysis results providing system according to another exemplary embodiment of the present invention can be provided in which a server side computer provides numerical analysis results to a user side computer connected to a network to perform a numerical analysis about a working member and a forming member created by using a desired material. The user side computer can include: an input arrangement inputting data containing a material name and a property item; a storage arrangement storing addresses of the server side computer corresponding to the material name and the property item; and a material name and property item transmitting arrangement transmitting the data containing the material name and the property item to the server side computer having the address corresponded to the material name and the property item inputted from the input arrangement. The server side computer can includes: (i) a material property data storage arrangement in which the material name and the property item are stored with corresponding to any one or more kinds of material property data from a mechanical property value, a thermal physical property value, and an electromagnetic property value as for plural materials; (ii) a material name and property item receiving arrangement receiving the data containing the material name and the property item transmitted from the material name and property item transmitting arrangement of the user side computer; (iii) an extracting arrangement extracting any one or more kinds of material property data from the mechanical property value, the thermal physical property value, and the electromagnetic property value corresponding to the material name and the property item stored by the material property data storage arrangement based on the received material name and property item; (iv) a numerical analysis arrangement performing a numerical analysis by using the material property data extracted by the extracting arrangement; and (v) a numerical analysis results transmitting arrangement transmitting the numerical analysis results by the numerical analysis arrangement to the user side computer. The user side computer further can includes: a numerical analysis results receiving arrangement receiving the numerical analysis results transmitted from the numerical analysis results transmitting arrangement of the server side computer.

A numerical analysis data providing device according to a further exemplary embodiment of the present invention can be provided which is configured for providing numerical analysis data to a user side computer connected to a network to perform a numerical analysis about a processing member and a forming member created by using a desired material. The device can include: (i) a material property data storage arrangement in which a material name and a property item are stored with corresponding to any one or more kinds of material property data from a mechanical property value, a thermal physical property value, and an electromagnetic property value as for plural materials; (ii) a material name and property item receiving arrangement receiving the material name and the property item transmitted from the user side computer; (iii) an extracting arrangement extracting any one or more kinds of material property data from the mechanical property value, the thermal physical property value, and the electromagnetic property value corresponding to the material name and property item stored by the material property data storage arrangement based on the received material name and property item; and (iv) a material property data transmitting arrangement transmitting the material property data extracted by the extracting arrangement to the user side computer.

A numerical analysis data unitization device according to still another exemplary embodiment of the present invention can be provided which is configured for receiving a provision of numerical analysis data from a server side computer connected to a network to perform a numerical analysis about a processing member and a forming member created by using a desired material. The device can include: (i) an input arrangement inputting a material name and a property item; (ii) a storage arrangement storing addresses of the server side computer corresponded to the material name and the property item; (iii) a material name and property item transmitting arrangement transmitting the material name and the property item to the server side computer having the address corresponded to the material name and the property item inputted from the input arrangement, (iv) a material property data receiving arrangement receiving the material property data extracted from a material property data storage arrangement based on the material name and the property item and transmitted at the server side computer; and (v); and a numerical analysis arrangement configured for performing a numerical analysis by using the material property data so that a user does not concern substances of the material property data.

A numerical analysis data providing method according to a further exemplary embodiment of the present invention can be provided in which a server side computer may provide numerical analysis data to a user side computer connected to a network to perform a numerical analysis about a working member and a forming member created by using a desired material. The exemplary method can include: (i) transmitting a material name and a property item to the server side computer having an address corresponded to the material name and the property item inputted from an input arrangement at the user side computer, (ii) receiving the material name and the property item transmitted from the user side computer; (iii) extracting any one or more kinds of material property data from a mechanical property value, a thermal physical property value, and an electromagnetic property value corresponding to the material name and property item stored by a material property data storage arrangement in which the material name and the property item are stored with corresponding to any one or more kinds of material property data from the mechanical property value, the thermal physical value, and the electromagnetic property value as for plural materials based on the received material name and property item; and (iv) transmitting the extracted material property data to the user side computer so as to be available to a numerical analysis but invisible to a user at the server side computer, and further receiving the material property data transmitted from the server side computer, at the user side computer.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which:

FIG. 1 is a diagram showing an exemplary configuration of a numerical analysis data providing system according to a first exemplary embodiment of the present invention;

FIG. 2 is an example of exemplary structural analysis input data provided by a direct input;

FIG. 3 is an example of exemplary structural analysis input data provided by an external input;

FIG. 4 is an exemplary reference table making a connection with data server addresses while using a material name, a data type, a model identification number as search keys according to an exemplary embodiment of the present invention;

FIG. 8 is a diagram showing an exemplary configuration of numerical analysis results providing system according to a second exemplary embodiment of the present invention;

FIG. 10 is an exemplary input screen of a user side computer according to a further exemplary embodiment of the present invention.

DETAILED DESCRIPTION OF EXEMPLARY EMBODIMENTS OF INVENTION

First Exemplary Embodiment

Figures 5, 6:
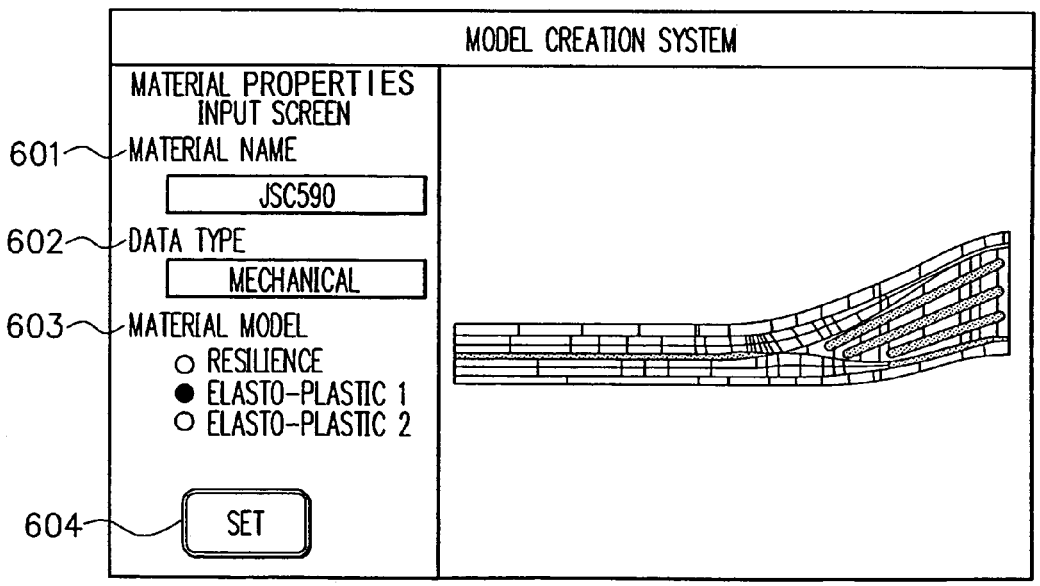
FIG. 5 is an exemplary reference table making a connection with numeric data while using the material name, the data type, the model identification number as the search keys according to an exemplary embodiment of the present invention.
FIG. 6 is an exemplary input screen display of a user side computer according to an exemplary embodiment of the present invention.

In FIG. 1, an exemplary configuration of a numerical analysis data providing system is shown according to a first exemplary embodiment of the present invention. As shown in FIG. 1, in the exemplary embodiment of the numerical analysis data providing system of the present invention, a user side computer 10 (e.g., the numerical analysis data utilization device) and a server side computer 11 (e.g., the numerical analysis data providing device) are connected via a network 12, for example, so as to enabling a communication according to, e.g., a TCP/IP protocol, and the server side computer 11 (e.g., the numerical analysis data providing device) provides numerical analysis data to the user side computer 10 (e.g., the numerical analysis data utilization device).

An example to provide material property data in a structural analysis is described herein when the structural analysis by an exemplary embodiment of a finite element method is performed for a processing member and a forming member created by using a desired material. For example, only one user side computer 10 and one server side computer 11 for each are shown in FIG. 1, however, it should be understood that each/both can be provided as a plurality of systems.

The user side computer 10 can use a data input/output program 13, a numerical analysis program 14 executing the numerical analysis, a reference table 15, a communication program 16. The server side computer 11 can utilize an accounting program 17, a reference table 18, a communication program 19.

According this exemplary embodiment, both a direct input and an external input receiving a provision from the server side computer 11 are possible as an input of physical property data (material property data) for the user side computer 10.

In FIG. 2, an exemplary direct input example of the physical property data for the user side computer 10 is shown. In general, an input data 1 of a structural analysis by the exemplary finite element method can be composed of a nodal point data 3 representing coordinates of respective nodal points, an element data 4 representing nodal point numbers composing respective elements, a physical property data 5 representing a physical property of the element, a geometrical shape data 6 representing a geometrical shape such as a shell thickness of the element, a boundary condition data 7 representing a load and a constraint, a calculation condition data 8 representing a time increment, a convergence condition, and so on, in addition to an analysis title data 2, etc.

In the example shown in FIG. 2, total eight numeric values of a modulus of elasticity (e.g., Young's modulus, Poisson's ratio), a work hardening characteristics (e.g., yield stress, plastic coefficient, work hardening index, offset distortion) based on an n-th power hardening model, an anisotropy parameter (e.g., Lankford value), and a density can be directly inputted as the physical property data 5 respectively. The structural analysis program (e.g., the numerical analysis program 13) reading the input data can create a stiffness matrix, a solution of simultaneous linear equations, calculations of a displacement, a strain, and a stress, and an output of results.

In FIG. 3, an external input example of the physical property data for the user side computer 10 is shown. for example, the input data other than the physical property data 5 may be the same as the data directly inputted as described above with reference to FIG. 2. The label—"SOURCE=NET"—in the physical property data 5 is illustrated to specify that the physical property data is stored at the server side computer 11 on the network 12. A material name of "spcc", a material model identification number of "003" (called as a property item including the data type "MECHANICAL: mechanical property") can be inputted from an input arrangement of the user side computer 10. In this drawing, the material model identification number is provided to identify a type of the physical property data (mechanical property, thermal physical property, electromagnetic property, other physical properties, and so on), a type of material model (elastic, elasto-plastic, visco-plastic model, and so on), a name of an analysis program, a version, and so on. Thus, it is not necessarily for the identification number to be a single numeric value, and it may be plural code numbers, etc.

The exemplary structural analysis program (e.g., the numerical analysis program 14) reading the input data shown in FIG. 3 refers to the reference table 15 in which the material name, the data type, and the material model identification number are corresponded to addresses of the server side computer 11 (e.g., a data server) which can be a storing facility of the material property data as shown in FIG. 4, based on the material name and the material model identification number, and can connect to the corresponding server side computer 11 on the network 12.

At the server side computer 11, it is possible to provide the material property data only to a specific user by performing an authentication of a user at a time a connection is started. The server side computer 11 capable of accepting the connection calls the material property data from a database by using, for example, the material name and the material model identification number as search keys with reference to a reference table 18 as shown in FIG. 5, based on the requested material name and material model identification number, to transmit to the user side computer 10 in an appropriate format.

At such time, the server side computer 11 records actual usages by each user such as a connect time, a data transfer amount, after a receiving of the user side computer 10 can be confirmed, to thereby perform a charging. For example, a transmission log file (e.g., client name, connection date and hour, transmission data amount, and so on) can be updated each time when the material property data is transmitted to the user side computer 10, and it is completely reviewed and/or combined regularly to charge in accordance with a total communication amount.

The structural analysis program (e.g., the numerical analysis program 14) executed on the user side computer 10 receiving the material property data can substantially perform a creation of the stiffness matrix, a solution of simultaneous linear equations, calculations of the displacement, the strain, and the stress, and an output of results. As the structural analysis program, for example, NASTRAN, MARC, ABAQUS, LS-DYNA, PAM-CRASH, etc. are known.

At the user side computer 10, the numeric value of the received material property data may be displayed to a user in a visible state, and it can enable a reuse (e.g., an unauthorized copy) of the once provided material property data. Consequently, it may be desirable to encrypt the material property data at the server side computer 11, and then transmit to the user side computer 10. In such case, the numerical analysis program 14 can use the encrypted material property data for the analysis by decrypting the data, but it is possible to secure a confidentiality of the data and possibly prevent the reuse of the numeric data by making the data invisible to the user.

It should be understood that an input style and format are not limited to the above-stated example, and they may have arbitrary style and format by each software. For example, an input screen as shown in FIG. 6 may be displayed on a display device of the user side computer 10. In such exemplary input screen, a material name 601 (for example, a standard name such as JIS, DIN, or a standard name by each manufacturer is inputted. "JSC590" in the illustrated example), a data type 602 ("MECHANICAL: mechanical property" in the shown example), are inputted respectively, and a material model 603 (e.g. an elasto-plastic 1: static deformation) can be selected after an object model is selected. A set button 604 may be press-operated, and thereby, it can be connected to the corresponding server side computer 11 on the network 12 with reference to a reference table in which the material name, the data type, the material model are corresponded to addresses of the server side computer 11 (data server) being the storing place of the material property data.

Figure 7:
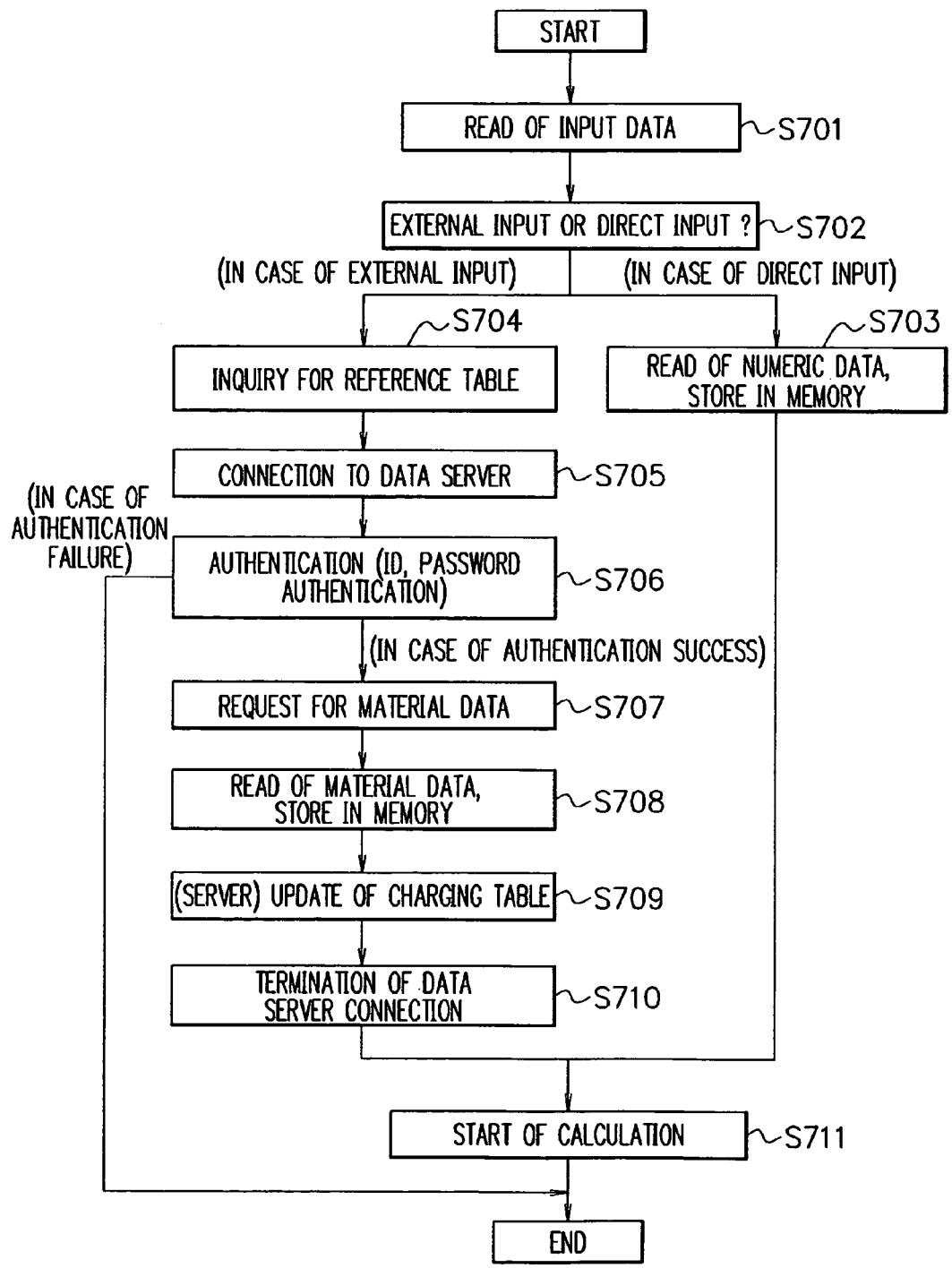
FIG. 7 is an exemplary flow chart for explaining a flow of a data provision according to an exemplary embodiment of the present invention.

FIG. 7 shows an exemplary flow diagram of a data provision according to an exemplary embodiment of the present invention. For example, at the user side computer 10, the input data of the structural analysis shown in FIG. 2 or FIG. 3 is read (step S701). It is then determined as to whether direct input or external input (step S702), and if it is the direct input, a numeric data is read (step S703), such data is stored in a memory of the computer, and a calculation is initiated, e.g., immediately (step S711). If the input is determined to be the external input, an inquiry can be performed into the reference table shown in FIG. 4 (step S704), a destination for connection of the server side computer 11 can be obtained, and the connection may be initiated (step S705).

When the connection is started, a user identification number (ID) and a password are validated (step S706), and when an authentication succeeds, required material property data can be requested based on the material name, the data type, the model identification number, and etc., then a data main body, e.g., the material property data can be received (step S707). Such material property data can be stored in the memory (step S708), the connection with the server side computer 11 may be terminated (step S710), and thereafter, the calculation can be initiated, e.g., immediately (step S711). Further, when the connection with the server side computer 11 is terminated, a charging table of the server side computer 11 can be updated (step S709).

Second Embodiment

As shown in FIG. 8, an exemplary configuration of a numerical analysis results providing system according to a second exemplary embodiment of the present invention is provided. In particular, the same reference numerals and symbols are used in FIG. 8 to designate same and corresponding components as the above-described first exemplary embodiment (e.g., see FIG. 1), and the detailed description thereof is thus not provided below. In the second exemplary embodiment, the numerical analysis program 14 can be implemented on the server side computer 11, instead of on the user side computer 10. For example, the user side computer 10 likely only has functions for an input of data of the material name and the property item and for a display of analysis results in this exemplary embodiment.

In the case of the second exemplary embodiment and with reference to FIG. 3, the nodal point data 3 representing the coordinates of the respective nodal points, the element data 4 representing the nodal point number composing respective elements, the geometrical shape data 6 representing the geometrical shape such as a shell thickness of the element, the boundary condition data 7 representing the load and the constraint, the calculation condition data 8 representing the time increment and the convergence condition, and so on, other than the physical property data 5 are inputted, "SOURCE=NET" is set in the physical property data 5, and the material name and the material model identification number (e.g., referred to as the "property item" including the data type) are inputted.

The structural analysis program (e.g., the numerical analysis program 14) reading the input data shown in FIG. 3 refers to the reference table 15 in which the material name, the data type, and the material model identification number are corresponded to addresses of the server side computer 11 (e.g., the data server) being the storing place of the material property data as shown in FIG. 4, based on the material name and the material model identification number, to connect to the corresponding server side computer 11 on the network 12.

At the server side computer 11, the connection is authorized, e.g., only for a specific user by performing the authentication of the user when the connection is started. If the connection is authorized, the user side computer 10 transmits the input data of the structural analysis shown in FIG. 3. After the input data is transmitted, the connection with the user side computer 10 can be once released.

The server side computer 11 receiving the input data, can make a request for the material property data from the database main body while using, for example, the material name and the material model identification number as the search keys with reference to the reference table 18 as shown in FIG. 5, based on the requested material name and the material model identification number.

The structural analysis program (e.g., the numerical analysis program 14) executed on the server side computer 11 can create the stiffness matrix, the solution of simultaneous linear equations, the calculations of the displacement, the strain, and the stress, by using the material property data called from the database main body and the input data (nodal point data 3, element data 4, geometrical shape data 6, boundary condition data 7, calculation condition data 8, and so on) received from the user side computer 10.

Figure 9A:
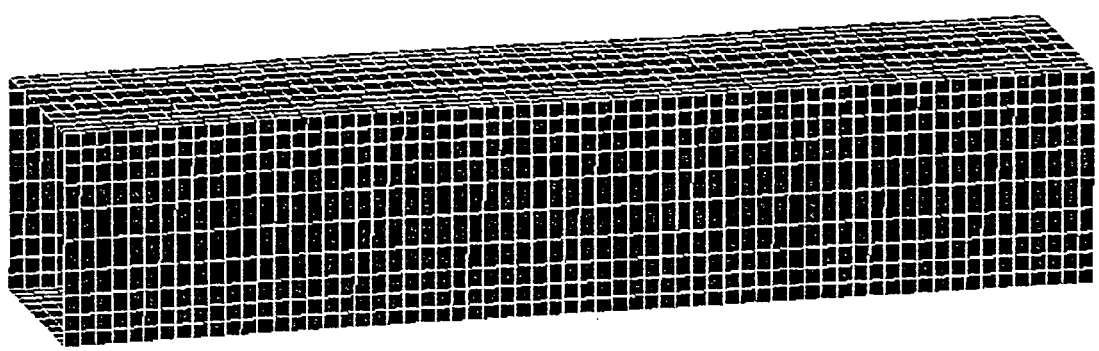
FIG. 9A is an exemplary display of an analysis model.
Figure 9B:
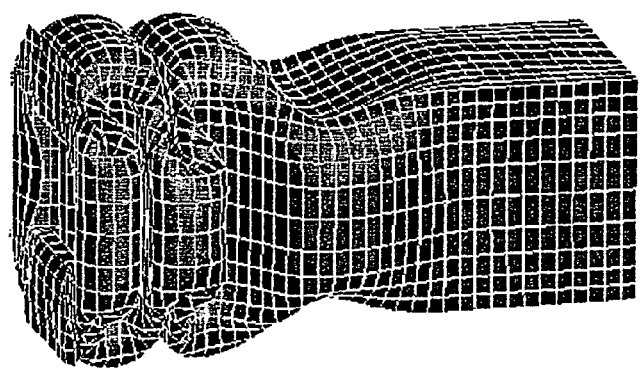
FIG. 9B is an exemplary display of an analysis result (e.g., a distorted distribution) of the analysis model.

Subsequently, analysis results files of the displacement, the stress distribution, and so on are replied to the user side computer 10 as, for example, an attachment of an electric mail. As shown in FIGS. 9A and 9B, exemplary analysis model and analysis results (e.g., a distorted distribution) thereof are provided therein as an example. Such results can be replied to the user side computer 10 as the attachment of the electric mail.

Further, the transmission log file (e.g., client name, connection date and hour, transmission data amount, and so on) can be updated at the server side computer, for example, each time when the analysis results file is transmitted to the user side computer 10, and it is totalized regularly to charge in accordance with the total communication amount.

Incidentally, the input style and format are not limited to the above-stated example, and they may have arbitrary style and format by each software. For example, the input screen as shown in FIG. 10 may be displayed on the display device of the user side computer 10. In this input screen, a material name 1001 (for example, a standard name such as JIS, DIN, or a standard name by each manufacturer is inputted. "JSC590" in the shown example), a data type 1002 ("MECHANICAL: mechanical property" in the shown example), are inputted respectively, and a material model 1003 (e.g., elasto-plasticity 1: static deformation) can be selected after an object model is selected. At another exemplary screen, required or preferred model data such as the nodal point data, the element data, the geometrical shape data, the boundary condition data, the calculation condition data can be defined, and the input data of the structural analysis as shown in FIG. 3 can be created by press-operating an input data write button 1004. Subsequently, a transmission button 1005 can be press-operated, and thereby, it is connected to the corresponding server side computer 11 on the network 12 with reference to the reference table in which the material name, the data type, and the material model are corresponded to addresses of the server side computer 11 (e.g., data server) being the storing place of and the material property data.

Hereinabove, exemplary embodiments of the present invention are described. It should be understood that connection modes of the computers shown in FIGS. 1 and 8 are not limited to these examples, and a user's computer (e.g., the user side computer 10) may be directly or indirectly connected to a data server (e.g., the server side computer 11) via a telephone line. Additionally, in the above-stated embodiments, the structural analysis is exemplified, but it may be applied to, e.g., a heat-transfer analysis, a fluid analysis, an electromagnetic filed analysis. As a heat conduction analysis program, for example, MARC, ABAQUS, LS-DYNA, and so on are known. Besides, as a fluid analysis program, for example, FLUENT, STAR-CD, PHOENICS, FIDAP, etc. are known. Further, as an electromagnetic filed analysis program, for example, JMAG, etc. are known.

In addition, contents of the numeric data provided by the exemplary embodiments of the present invention is not limited to the material property data. For example, the material property data may be arbitrary data which can be preferred to necessary for the numerical analysis such as a boundary condition data, a CAD data representing a shape of an analysis object.

EXAMPLE 1

A press forming analysis system of steel sheets shown in FIG. 1 can be experimentally manufactured while applying the exemplary embodiments of the present invention. An exemplary part of the input data is shown in FIG. 3. Here, the nodal point data and the element data can be shape data of a mold or a material to be processed, and directly inputted by a normal method. The physical property data is the mechanical property of the material to be processed (e.g., data type: MECHANICAL), and the external input via the network (SOURCE=NET) can be specified as the input method. The material is a cold rolled mild steel with a board thickness of 1.2 mm (material name: spcc), and as the material model, an elasto-plastic n-th power hardening law model (e.g., material model identification number: 003) prepared by an analysis software, is specified. Subsequently, the boundary condition data are a tool movement, a blank holding load, a friction coefficient, and so on, and they are directly inputted by the normal method. In the last, the calculation conditions are the time increment, the convergence condition, etc, and they are also directly inputted by the normal method.

Subsequently, the above-described input data of the material name and the property item are read into a press forming analysis software existing on the server side computer 11, processed in the sequence shown in FIG. 7, an address of the data server (e.g., www.abc.com) can be obtained from the reference table shown in FIG. 4, to connect to the server via the Internet. Subsequently, the material property value data which are equivalent to the directly inputted data shown in FIG. 2, e.g., corresponding to total eight values of the modulus of elasticity (e.g., Young's modulus, Poisson's ratio), the work hardening characteristics (e.g., yield stress, plastic coefficient, work hardening index, offset distortion) based on the n-th power hardening law model, the anisotropy parameter (e.g., Lankford value), and the density are received from the server side computer 11, stored on the memory, and thereafter, a forming calculation by the finite element method can be performed.

At such time, at the server side computer (e.g., located at www.abc.com), the number of times of data transmission can be recorded by each user, and the charging in accordance with the data transmission amount is performed. By using this system, it is not necessary for a user (analyst) to concern substances of the material property data at all, efforts to obtain the material property data are saved drastically, a reliability of the analysis results is increased, and the analysis time is reduced. On the other hand, it is possible for a manufacturer side providing the data server to perform a unified control of the latest material property value data constantly, and to maintain the confidentiality of the data.

EXAMPLE 2

A press forming analysis system of steel sheets shown in FIG. 8 applying the exemplary embodiments of the present invention can be experimentally manufactured. The user side computer 10 read in the input data shown in FIG. 3 can obtain the address of the data server (e.g., www.abc.com) from the reference table shown in FIG. 4 to connect to the data server via the Internet, and transmits all of the input data to the server side computer 11. Subsequently, the server side computer 11 receiving the input data obtains the material property data from the reference table shown in FIG. 5, and executes a forming analysis. When the calculation is terminated, the calculated result can be transmitted to a user specified in advance by an electric mail, and a charging procedure may be performed in accordance with the calculation time. By using this exemplary system, it is not necessary for the user to install the numerical analysis program individually, in addition, it is possible for the manufacturer side providing the data server to perform the unified control of the latest material property value data and the analysis results constantly, and to maintain the confidentiality of the data.

The above-described user side computer and the server side computer can be composed of a CPU or an MPU of a computer, RAM, ROM, RAM and so on, and the present embodiment is realized by operating the programs stored in the RAM, ROM, and so on as described above.

Consequently, the programs in themselves realize the functions of the above-described exemplary embodiments, and constituting the exemplary embodiments of the present invention. As a transmission medium of the exemplary program, a communication medium (e.g., wired circuit, radio circuit, and so on such as an optical fiber) in a computer network (e.g., LAN, WAN such as the Internet, radio communication network, and so on) system to propagate and supply program information as carrier waves can be used.

Further, an exemplary arrangement to supply the above-stated programs to the computer, for example, a storage medium storing the program constitutes the present invention. As such storage medium, for example, a flexible disk, a hard disk, an optical disk, a magnetic optical disk, a CD-ROM, a magnetic tape, a nonvolatile memory card, a ROM, etc. can be used.

In addition, the shape and structure of the respective portions shown in the above-described exemplary embodiments Can be considered in all respects as illustrative and no restrictive. In particular, the exemplary embodiments of the present invention may be embodied in other specific forms without departing from the spirit or essential characteristics thereof.

Industrial Applicability

According to the exemplary embodiments of the present invention, it is possible to provide numerical analysis data with high reliability while maintaining a confidentiality in a computer simulation of a structural analysis, a heat conduction analysis, a fluid analysis, and an electromagnetic filed analysis using a finite element method and a finite difference method, and a reliability and accuracy of the simulation increase significantly. Besides, it is possible to retrieve compensations for experimental expenses and so on from users, and therefore, it becomes easy to maintain and upgrade a material property data storage arrangement (e.g., database) such as an addition, update, and so on of material property data.

The foregoing merely illustrates the exemplary principles of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the invention and are thus within the spirit and scope of the invention. All publications, applications and patents cited above are incorporated herein by reference in their entireties.

What is claimed is:

1. A system, comprising:
 a server-side computer hardware arrangement configured to provide numerical analysis data to a user-side computer hardware arrangement which is connected to a network to perform a numerical analysis regarding a working member and a forming member, the working and forming members being produced by using a predetermined material,
 wherein the user-side computer hardware arrangement comprises:
  i. a first arrangement configured to input a material name and a material model identification number identifying at least one of a type of material property data, a type of material analysis model, a name of an analysis program or a version thereof, wherein at least one of (a) a mechanical property value, (b) a thermal physical property value, or (c) an electromagnetic property value are set as the type of material property data, and wherein the type of material analysis model is defined for each type of material property data:
  ii. a second arrangement configured to store addresses of the server-side computer hardware arrangement corresponding to the material name and the material model identification number, and
  iii. a third arrangement configured to transmit the material name and the material model identification number to the server-side computer hardware arrangement having the address corresponding to the material name and the material model identification number inputted from the first arrangement,
 wherein the server-side computer hardware arrangement comprises:
  i. a fourth arrangement configured to store a material property data corresponding to the material name and the material model identification number from (a) the mechanical property value, (b) the thermal physical property value, or (c) the electromagnetic property value as for a number of materials, ii. a fifth arrangement configured to receive the material name and the material model identification number transmitted from the third arrangement of the user-side computer hardware arrangement, iii. a sixth arrangement configured to extract the one or more types of the material property data, stored by the fourth arrangement, based on the received material name and the material model identification number from (a) the mechanical property value, (b) the thermal physical property value, or (c) the electromagnetic property value and iv. a seventh arrangement configured to encrypt the material property data extracted by the sixth arrangement, and transmit the encrypted material property data to the user-side computer hardware arrangement, and wherein the user-side computer hardware arrangement further comprises:

i. an eighth arrangement configured to receive the material property data transmitted from the seventh arrangement of the server-side computer hardware arrangement, and ii. a ninth arrangement configured to (i) perform a numerical analysis by decrypting the encrypted material property data and availing the decrypted material property data for the numerical analysis, and (ii) using the decrypted material property data such that the user is unconcerned regarding substances of the material property data in a manner such that the material property data is rendered invisible to the user, and the material property data is prevented from being reused.

2. The system according to claim 1, wherein the server-side computer hardware arrangement further comprises a tenth arrangement configured to avail the material property data to the ninth arrangement and precluding the user from having access thereto when the material property data extracted by the sixth arrangement is transmitted to the user-side computer hardware arrangement.

3. The system according to claim 1, wherein the material model identification number identifies the name of the analysis program.

4. The system according to claim 1, wherein the type of material analysis model is at least one of an elastic model, an elasto-plastic model or a visco-plastic model.

5. A system for providing numerical analysis data to a user-side computer hardware arrangement connected to a network to perform a numerical analysis regarding a working member and a forming member created using a predetermined material, comprising:

a first arrangement configured to store a material name and a material model identification number identifying at least one of a type of material property data, a type of material analysis model, a name of an analysis program or a version thereof, which correspond to one or more types of a material property data from (a) a mechanical property value, (b) a thermal physical property value, or (c) an electromagnetic property value provided for a number of materials, wherein the type of material analysis model is defined for each type of material property data;

a second arrangement configured to receive the material name and the material model identification number transmitted from the user-side computer hardware arrangement;

a third arrangement configured to extract the one or more types of the material property data, stored by the first arrangement, based on the received material name and the material model identification number received from (a) the mechanical property value, (b) the thermal physical property value, and (c) the electromagnetic property value;

a fourth arrangement configured to encrypt the material property data extracted by the third arrangement, and transmit the encrypted material property data to the user-side computer hardware arrangement; and a fifth arrangement configured to decrypt the encrypted material property data and avail the decrypted material property data and include a numerical analysis arrangement provided in the user-side computer hardware arrangement and invisible to a user when the material property data extracted by the third arrangement is transmitted to the user-side computer hardware arrangement, and the material property data is prevented from being reused.

6. The system according to claim 5, wherein the material model identification number identifies the name of the analysis program.

7. The system according to claim 5, wherein the first arrangement is configured to store the material name and the material model on a server-side computer hardware arrangement, and the fifth arrangement is configured to avail the type of material property data on the user-side computer hardware arrangement.

8. The system according to claim 5, wherein the type of material analysis model is at least one of an elastic model, an elasto-plastic model or a visco-plastic model.

9. A system for receiving a provision of numerical analysis data from a server-side computer hardware arrangement connected to a network to perform a numerical analysis regarding a working member and a forming member created using a predetermined material, comprising:

a first arrangement configured to input a material name and a material model identification number identifying at least one of a type of material property data, a type of material analysis model for each type of material property data, a name of an analysis program or a version thereof;

wherein at least one of (a) a mechanical property value, (b) a thermal physical property value, or (c) an electromagnetic property value are set as the type of material property data, and wherein the type of material analysis model is defined for each type of material property data;

a second arrangement configured to store addresses of the server-side computer hardware arrangement corresponding to the material name and the material model identification number;

a third arrangement configured to transmit the material name and the material model identification number to the server-side computer hardware arrangement having at least one of the addresses corresponding to the material name and the material model identification number inputted from the first arrangement, a fourth arrangement configured to receive one or more types of a material property data from (a) the mechanical property value, (b) the thermal physical property value, and (c) the electromagnetic property value corresponding to the material name, that are extracted from a material property data storage arrangement based on the material name and the material model identification number, and encrypted and transmitted by the server-side computer hardware arrangement; and a fifth arrangement configured to (i) perform a numerical analysis by decrypting the encrypted material property data and availing the decrypted material property data for the numerical analysis, and (ii) using the decrypted material property data such that the user is unconcerned regarding substances of the material property data in a manner such that the material property data is rendered invisible to the user, and the material property data is prevented from being reused.

10. The system according to claim 9, wherein the material model identification number identifies the name of the analysis program.

11. The system according to claim 9, wherein the server-side computer hardware arrangement is configured to store the material name and the material model identification number corresponding to the one or more types of the material property data from at least one of: (a) the mechanical property value, (b) the thermal physical property value, or (c) the electromagnetic property value.

12. The system according to claim 9, wherein the type of material analysis model is at least one of an elastic model, an elasto-plastic model or a visco-plastic model.

13. A method for providing numerical analysis data by a server-side computer hardware arrangement to a user-side computer hardware arrangement which is connected to a network to perform a numerical analysis regarding a working member and a forming member created using a predetermined material, comprising:

transmitting a material name and a material model identification number identifying at least one of a type of material property data, a type of material analysis model, a name of an analysis program or a version thereof to the server-side computer hardware arrangement having an address corresponding to the material name and the material model identification number inputted from an input arrangement at the user-side computer hardware arrangement, wherein at least one of (a) a mechanical property value, (b) a thermal physical property value, or (c) an electromagnetic property value are set as the type of material property data, and wherein the type of material analysis model is defined for each type of material property data, receiving the material name and the material model identification number transmitted from the user-side computer hardware arrangement;

extracting one or more types of material property data from the mechanical property value, (a) the thermal physical property value, or (c) the electromagnetic property value corresponding to the material name and the material model identification number stored by a material property data storage arrangement in which the material name and the material model identification number are stored which correspond to one or more types of the material property data from (a) the mechanical property value, (b) the thermal physical value, or (c) the electromagnetic property value for a number of materials based on the received material name and the material model identification number;

encrypting the extracted material property data, and transmitting the encrypted material property data to the user-side computer hardware arrangement so as to be decrypted and available to a numerical analyzer and invisible to a user, from the server-side computer hardware arrangement, and the material property data is prevented from being reused; and receiving, at the user-side computer hardware arrangement, the encrypted material property data transmitted from the server-side computer hardware arrangement.

14. The method according to claim 13, wherein the material model identification number identifies the name of the analysis program.

15. The method according to claim 13, wherein the server-side computer hardware arrangement comprises the material property data storage arrangement.

16. The method according to claim 13, wherein the type of material analysis model is at least one of an elastic model, an elasto-plastic model or a visco-plastic model.

* * * * *

UNITED STATES PATENT AND TRADEMARK OFFICE
CERTIFICATE OF CORRECTION

PATENT NO.        : 8,543,666 B2                                                                Page 1 of 1
APPLICATION NO.   : 10/584170
DATED             : September 24, 2013
INVENTOR(S)       : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Fifteenth Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,543,666 B2
APPLICATION NO. : 10/584170
DATED : September 24, 2013
INVENTOR(S) : Noriyuki Suzuki et al.

Page 1 of 1

It is certified that error appears in the above-identified patent and that said Letters Patent is hereby corrected as shown below:

ON THE TITLE PAGE:

At item (73), Assignee, change:

"(73) Assignee: Nippon Steel & Sumitomo Metal Corporation, Tokyo (JP)"

to:   --(73) Assignees: Nippon Steel & Sumitomo Metal Corporation, Tokyo (JP); Arcelor France, Cherubini, St. Denis (FR)--.

Signed and Sealed this
Second Day of August, 2016

Michelle K. Lee
*Director of the United States Patent and Trademark Office*